United States Patent
Yoo et al.

(10) Patent No.: US 8,936,744 B2
(45) Date of Patent: Jan. 20, 2015

(54) PHOTOCURABLE RESIN COMPOSITION CONTAINING FLUORINE AND METHOD FOR PRODUCING A RESIN MOLD USING SAME

(75) Inventors: Jae-won Yoo, Hwaseong (KR); Byung-uk Kim, Hwaseong (KR); Un-yong Kim, Hwaseong (KR); Eun-jin Kwak, Hwaseong (KR)

(73) Assignee: Dongjin Semichem Co., Ltd., Incheon (KR)

( * ) Notice: Subject to any disclaimer, the term of this patent is extended or adjusted under 35 U.S.C. 154(b) by 171 days.

(21) Appl. No.: 13/381,151

(22) PCT Filed: Jul. 7, 2010

(86) PCT No.: PCT/KR2010/004418
§ 371 (c)(1),
(2), (4) Date: Jan. 5, 2012

(87) PCT Pub. No.: WO2011/007979
PCT Pub. Date: Jan. 20, 2011

(65) Prior Publication Data
US 2012/0114906 A1      May 10, 2012

(30) Foreign Application Priority Data

Jul. 13, 2009   (KR) .................... 10-2009-0063667

(51) Int. Cl.
*B29C 33/00*   (2006.01)
*B29C 39/00*   (2006.01)
(Continued)

(52) U.S. Cl.
CPC ............... *B29C 39/006* (2013.01); *B29C 59/14* (2013.01); *B29C 59/142* (2013.01); *B29C 33/3857* (2013.01); *B29C 33/40* (2013.01);
(Continued)

(58) Field of Classification Search
CPC ............................. B29C 59/14; B29C 59/142
USPC ......... 525/123, 214, 424, 431, 452, 453, 455, 525/457; 522/90, 91, 96, 97, 98; 264/401, 264/413, 415, 414, 298, 299
See application file for complete search history.

(56) References Cited

U.S. PATENT DOCUMENTS

2004/0013972 A1 * 1/2004 Nishimura et al. ......... 430/270.1
2006/0189750 A1 * 8/2006 Maier et al. .................. 524/589

(Continued)

FOREIGN PATENT DOCUMENTS

| JP | 2006-523728 | 10/2006 |
|---|---|---|
| KR | 10-2007-0031858 | 3/2007 |
| KR | 10-2008-0101584 | 11/2008 |

*Primary Examiner* — Michael L Leonard
(74) *Attorney, Agent, or Firm* — Lexyoume IP Meister, PLLC

(57) ABSTRACT

There are provided a fluorine-containing photocurable resin composition and a method of preparing a mold comprising the same and more particularly, a photocurable resin composition having chemical resistance, mechanical properties and high transmittance, etc. as well as being easily wetted with and released from thermosetting or photocurable resins for pattern formation regardless of additional surface treatment, as opposed to the existing polymer resin materials used for resin molds, and a method of preparing a resin mold using the same.

4 Claims, 1 Drawing Sheet

(51) Int. Cl.
*B29C 59/14* (2006.01)
*B29C 33/38* (2006.01)
*B29C 33/40* (2006.01)
*B29C 33/42* (2006.01)
*B29C 33/56* (2006.01)
*C08G 18/67* (2006.01)
*C08L 75/16* (2006.01)

(52) U.S. Cl.
CPC .............. *B29C 33/424* (2013.01); *B29C 33/56* (2013.01); *C08G 18/672* (2013.01); *C08G 18/6775* (2013.01); *C08L 75/16* (2013.01)

USPC ........... 264/413; 264/401; 264/414; 264/415; 264/298; 264/299; 525/214; 525/424; 525/431; 525/452; 525/453; 525/455; 525/457; 522/90; 522/91; 522/96; 522/97; 522/98

(56) References Cited

U.S. PATENT DOCUMENTS

2008/0176049 A1* 7/2008 Ro et al. .................... 428/195.1
2010/0009137 A1  1/2010 Kodama

* cited by examiner

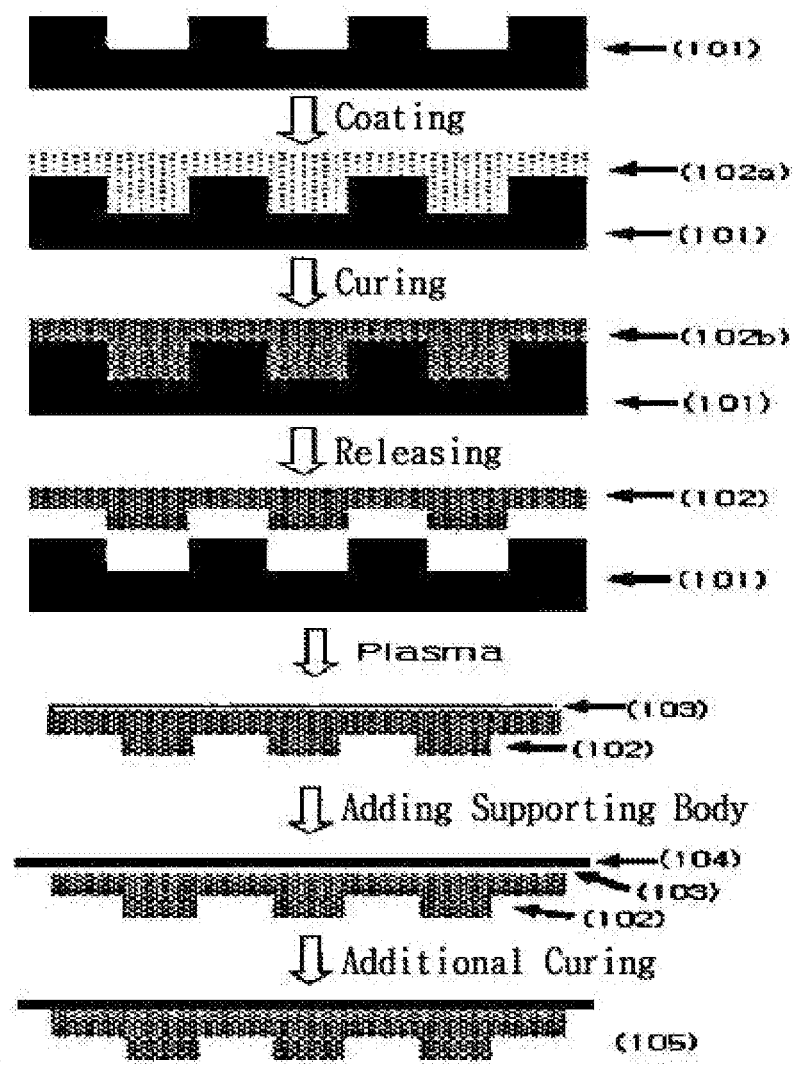

PHOTOCURABLE RESIN COMPOSITION CONTAINING FLUORINE AND METHOD FOR PRODUCING A RESIN MOLD USING SAME

FIELD OF THE INVENTION

The present invention relates to a fluorine-containing photocurable resin composition and a method of preparing a mold comprising the same and more particularly, to a photocurable resin composition having chemical resistance, mechanical properties and high transmittance, etc. as well as being easily wetted with and released from thermosetting or photocurable resins for pattern formation regardless of additional surface treatment, as opposed to silicon-type polymer resins, fluorine-type polymer resins, thermosetting or photocurable polymer resin materials used for the prior resin molds, and a method of preparing a resin mold using the same.

BACKGROUND OF THE INVENTION

It is well known that photolithography method has been widely used to form a fine pattern on substrates. The photolithography has merits in that it enables to imprint fine patterns in an even and stable way, but it has to undergo several-step processes (resin coating, thermal treatment, light exposure, development, cleansing, etching, etc.). Those complicated processes require expensive equipments in each step, make it difficult to control because of the margin in each process, and consume huge processing time to form patterns. They eventually become major problems causing an increase in manufacturing costs and a reduction in productivity.

Of the several methods developed to overcome the limitations of the prior photolithography methods, imprint lithography has been acknowledged to be a next-generation lithography technology. The imprint lithography technology makes it possible to fabricate a fine structure in an inexpensive and effective way, in which a stamp embossed with a fine structure is placed on the surface of a resist which has been spin coated or dispensed onto a substrate and pressed to transfer the fine structure.

Early imprint technology used a method of applying high pressure to the surface of a substrate coated by the resist under high temperature of not less than glass transition temperature and then cooling down and separating it. While this method has advantages in that the process is comparatively easy and it uses inexpensive equipments, it still requires long processing time and high pressure. In particular, since it requires high temperature as well as high pressure, there is a possibility that the substrates may be damaged and separation between the molds and the substrates may be difficult.

In the case of a resin mold using polydimethylsiloxane (PDMS), which is a typical silicon-type polymeric elastomer used for the prior resin molds, it can be easily in even contact with a substrate surface to form a pattern thereon because polydimethylsiloxane is an elastomer, it can be readily separated from the substrate surface after the pattern is formed because polydimethylsiloxane shows low adhesion to the resist surface coated thereby owing to its low surface energy, and it makes easy the absorption of a solvent due to its high gas permeability resultant to its 3-dimensional mesh structure. However, it may be readily deformed due to its low mechanical intensity and further, it may be deformed by swelling even in general organic solvents due to its low chemical resistance and its release and wettability may be deteriorated so that it has considerable restrictions on the selection of polymers and solvents to be used for pattern formation.

Fluorine-type resins have been proposed to compensate the drawbacks of those silicon-type resins. However, while the fluorine-type resins show excellent chemical resistance, release performance, and mechanical properties, their applications are significantly restricted because of their reduced wettability due to excessive release performance, their low compatibility with other substances including silicon resins, low transmittance and low adhesion to supporting substrates.

Urethane or acryl resins used for the existing resin molds have considerably low chemical resistance and release performance and thus, their commercial applications are severely limited in terms of low durability and productivity for commercial use.

The existing resin molds were often subject to additional surface treatment subsequent to the resin mold formation so as to enhance their release performance, chemical resistance and wettability, but the physical property enhancement through those attempts did not last long or made no significant difference.

SUMMARY OF THE INVENTION

Accordingly, it is an object of the present invention to provide a photocurable resin composition having chemical resistance, mechanical properties and high transmittance, etc. as well as being easily wetted with and released from thermosetting or photocurable resins for pattern formation regardless of additional surface treatment, as opposed to silicon-type polymer resins, fluorine-type polymer resins, thermosetting or photocurable polymer resin materials used for the prior resin molds.

It is another object of the present invention to provide a fluorine-containing photocurable resin composition capable of forming a fine pattern necessary to various electronic device industry processes including semiconductors and displays in an easy and stable way, a method of preparing a resin mold using the same, and the resin mold prepared by the method.

In order to achieve the objects, the present invention provides a photocurable resin composition wherein it comprises a) a reactive pre-polymer prepared by polymerizing i) a reactive fluorine-containing compound having a functional group; and ii) a reactive silicon-modified urethane compound having a functional group;

b) at least one compound selected from the group consisting of i) an olefin-type unsaturated compound;

ii) an unsaturated compound containing an epoxy group; and iii) a silicon-type compound containing an epoxy group, amine group or fluorine group; and c) a photo initiator.

Preferably, the fluorine-containing photocurable resin composition comprises a) 100 parts by weight of the reactive pre-polymer prepared by polymerizing i) 10 to 80% by weight of the reactive fluorine-containing compound having a functional group; and ii) 20 to 90% by weight of the reactive silicon-modified urethane compound having a functional group;

b) 5 to 100 parts by weight of at least one mixture compound selected from the group consisting of i) the olefin-type unsaturated compound;

ii) the unsaturated compound containing an epoxy group; and iii) the silicon-type compound containing an epoxy group, amine group or fluorine group; and c) 0.1 to 10 parts by weight of the photo initiator.

The present invention further provides a method of preparing a resin mold wherein it comprises S1) applying the fluorine-containing photocurable resin solution of the present invention to one side of a mold die with pattern formed thereon and curing it to transfer the pattern of the mold die; and S2) releasing the cured polymer resin with the pattern transferred thereto from the mold die.

Preferably, the present invention provides a method of preparing a resin mold wherein it further comprises, subsequent to the above S2) step, S3a) forming a plasma-treated surface on the back side of the cured polymer resin with the released pattern formed thereon;

S4a) forming a back-supporting body on the plasma-treated surface which is formed on the back side of the cured polymer resin; and S5a) adhering or curing the cured polymer resin with the back-supporting body formed thereon to prepare a polymer resin mold.

Moreover, preferably, the present invention provides a method of preparing a resin mold wherein it comprises, subsequent to the above S2) step, S3b) forming a plasma-treated surface on one side of a back-supporting body to be in contact with the cured polymer resin; and S4b) adhering or curing the cured polymer resin onto the plasma-treated surface which is formed on the back-supporting body to prepare a polymer resin mold.

Furthermore, the present invention provides a resin mold prepared by the method of preparing the resin mold.

The present invention, which relates to a fluorine-containing photocurable resin composition and a method of preparing a mold comprising the same, provides a photocurable resin composition having chemical resistance, mechanical properties and high transmittance, etc. as well as being easily wetted with and released from thermosetting or photocurable resins for pattern formation regardless of additional surface treatment, as opposed to silicon-type polymer resins, fluorine-type polymer resins, thermosetting or photocurable polymer resin materials used for the prior resin molds, and it enables to form a fine pattern necessary to various electronic device industry processes including semiconductors and displays in an easy and stable way.

BRIEF DESCRIPTION OF THE DRAWINGS

FIG. 1 is a schematic sectional view illustrating a method of preparing a resin mold according to a preferred embodiment of the present invention.

DETAILED DESCRIPTION OF THE INVENTION

Hereafter, the invention is described in detail.

The fluorine-containing photocurable resin composition of the present invention is characterized in that it comprises a) a reactive pre-polymer prepared by polymerizing i) a reactive fluorine-containing compound having a functional group; and ii) a reactive silicon-modified urethane compound having a functional group; b) at least one compound selected from the group consisting of i) an olefin-type unsaturated compound; ii) an unsaturated compound containing an epoxy group; and iii) a silicon-type compound containing an epoxy group, amine group or fluorine group; and c) a photo initiator.

The reactive pre-polymer used for the photocurable resin composition of the present invention is prepared by polymerizing i) a reactive fluorine-containing compound having a functional group; and ii) a reactive silicon-modified urethane compound having a functional group.

The reactive pre-polymer having a functional group forms a low surface energy when cured, so that it can be not only easily wetted with and released from thermosetting or photocurable resins for pattern formation but also form dense cross-linking and thus have chemical resistance of non-swelling against organic solvents without additional surface treatment.

The reactive fluorine-containing compound having a functional group of a) i) may be a fluorine-containing monomer or oligomer with polymerizability and preferably, it may have 1 to 10 functional groups, for example, those selected from (meth)acrylate, siloxane, imide, amide, vinyl, urethane, ester, epoxy, alcohol, etc. If the number of the functional groups exceeds 10, it might cause inconvenient use of a diluting agent to lower the increased density and further, the use of the diluting agent might deteriorate chemical resistance.

Specific examples of a) i) the reactive fluorine-containing compound having a functional group may include 6-perfluorohexanol, 3-perfluorobutylpropanol, 2-perfluoropropyltetrafluoropropanol, 2,5-ditrifluoromethyldioxaundecafluorononanol, octafluorohexanediol, perfluorobutylepoxypropane, perfluoromethylbutylepoxypropane, tetrafluoropropoxyepoxypropane, 1,4-bisepoxypropylperfluoro-n-butane, perfluorohexylethylene, 1-methoxyperfluoromethylpropane, 1,4-divinyldodecafluorohexane, 3-perfluorobutylhydroxypropylmethacrylate, 3-perfluorohexylhydroxylpropylmethacrylate, trifluoroethylmethacrylate, tetrafluoropropylmethacrylate, 2-perfluorohexylethylacrylate, 3-perfluoromethylbutyl-2-hydroxypropylacrylate, methyltrifluoroacetate, ethyltrifluoroacetate, trifluoroethylmethylether, tetrafluoroethylmethylether, hectafluorobutylamine, tridecafluoroheptylamine, and derivatives thereof.

When a) the reactive pre-polymer having a functional group is to be prepared, it is preferable to comprise 10 to 80% by weight of a) i) the reactive fluorine-containing compound having a functional group, and when it is within the above ranges, it may form a low surface energy when cured, so that it can be not only easily wetted with and released from thermosetting or photocurable resins for pattern formation but also form dense cross-linking and thus have chemical resistance of non-swelling against organic solvents without additional surface treatment The reactive silicon-modified urethane compound having a functional group of a) ii) may be obtained by reacting an isocyanate compound; an olefin-type unsaturated compound having at least one hydroxy group and functional group; and polydimethylsiloxane under a catalyst.

The reactive silicon-modified urethane compound having a functional group of a) ii) may be obtained by reacting 5 to 70% by weight of the isocyanate compound; 30 to 90% by weight of the olefin-type unsaturated compound having at least one hydroxy group and functional group; and 1 to 30% by weight of polydimethylsiloxane.

With regard to the isocyanate compound, there are no limitations on the number of isocyanate groups but preferably, those having at least two isocyanate groups, for example, aromatic isocyanates such as toluenediisocyanate, diphenylmethanediisocyanate, tolidinediisocyanate, and p-phenyleneisocyanate and aliphatic isocyanates such as hexamethylene diisocyanate, and isophoronediisocyanate may be used in alone or in combination thereof.

The olefin-type unsaturated compound having at least one hydroxy group and functional group may include 2-hydroxymethylmethacrylate, 2-hydroxyethylmethacrylate, 2-hydroxypropylmethacrylate, 4-hydroxyethylacrylate, 4-hydroxybutylacrylate, etc. and they may be used in alone or in combination thereof.

For polydimethylsiloxane, any commercially available products may be used and for example, various products having a density of not higher than 80000 cP are available in market, but those having the density of not higher than 500 cP may be preferably used in terms of handling and mixing performance.

In the preparation of a) the reactive pre-polymer having a functional group, a polymerization initiator used for the polymerization of i) the reactive fluorine-containing compound having a functional group; and ii) the reactive silicon-modified urethane compound having a functional group may be a radical polymerization initiator and in particular, it may include 2,2-azobisisobutyronitrile, 2,2-azobis(2,4-dimethylvaleronitrile), 2,2-azobis(4-methoxy 2,4-dimethylvaleronitrile), 1,1-azobis(cyclohexane-1-carbonitrile), or dimethyl 2,2-azobisisobutylate.

The reactive silicon-modified urethane compound having a functional group of ii) may be preferably included in 20 to 90% by weight, and if it is less than 20% by weight, it might have excellent release performance but cause deterioration in wettability and if it exceeds 90% by weight, it might have excellent wettability but cause deterioration in release as well as deterioration in chemical resistance and durability.

The photocurable resin composition of the present invention comprises b) i) an olefin-type unsaturated compound; ii) an unsaturated compound containing an epoxy group; and iii) a silicon-type compound containing an epoxy group, amine group or fluorine group. Preferably, at least one from each group may be selected and used in combination of two or more kinds.

The components of b) may not only function as a diluting agent for a) the pre-polymer having a functional group but also prevent swelling and breakage in organic solvents by increasing cross-linking density and increase release performance when fine pattern is formed.

The olefin-type unsaturated compound of b) i) may include methylmethacrylate, ethylmethacrylate, n-butyl methacrylate, sec-butyl methacrylate, tert-butyl methacrylate, methylacrylate, isopropyl acrylate, cyclohexyl methacrylate, 2-methylcyclo hexylmethacrylate, dicyclopentenylacrylate, dicyclopentanylacrylate, dicyclopentenylmethacrylate, dicyclopentanylmethacrylate, 1-adamantyl acrylate, 1-adamantyl methacrylate, dicyclopentanyloxyethylmethacrylate, isoboronylmethacrylate, cyclohexylacrylate, 2-methylcyclohexylacrylate, dicyclopentanyloxyethylacrylate, isoboronylacrylate, phenylmethacrylate, phenylacrylate, benzylacrylate, 2-hydroxyethylmethacrylate, 1,6-hexanedioldiacrylate, etc., and they may be used in alone or in combination thereof.

The unsaturated compound containing an epoxy group of b) ii) may include glycidyl acrylate, glycidyl methacrylate, glycidyl ethylacrylate, glycidyl-n-propylacrylate, glycidyl-n-butylacrylate, acrylic acid-methylglycidyl, methacrylic acid-methylglycidyl, acrylic acid-ethylglycidyl, methacrylic acid-ethylglycidyl, acrylic acid-3,4-epoxybutyl, methacrylic acid-3,4-epoxybutyl, acrylic acid-6,7-epoxyheptyl, methacrylic acid-6,7-epoxyheptyl, -ethylacrylic acid-6,7-epoxyheptyl, acrylic acid-3,4-epoxy cyclohexylmethyl, methacrylic acid-3,4-epoxy cyclohexylmethyl, 4-vinylcyclohexeneoxide, o-vinylbenzylglycidylether, m-vinylbenzylglycidylether, p-vinylbenzylglycidylether, etc., and they may be used in alone or in combination.

The silicon-type compound of b) iii) may include (3-glycidoxypropyl)trimethoxysilane, (3-glycidoxypropyl)triethoxysilane, (3-glycidoxypropyl)methyldimethoxysilane, (3-glycidoxypropyl)trimethoxysilane, (3-glycidoxypropyl) dimethylethoxysilane, (3-glycidoxypropyl)dimethylethoxysilane, 3-(methacryloxy)propyltrimethoxysilane, 3,4-epoxybutyltrimethoxysilane, 3,4-epoxybutyltriethoxysilane, 2-(3,4-epoxycyclohexyl)ethyltrimethoxysilane, 2-(3,4-epoxycyclohexyl)ethyltriethoxysilane, aminopropyltrimethoxy silane, etc., and they may be used in alone or in combination.

Preferably, b) the mixture compound selected from the group consisting of i) the olefin-type unsaturated compound; ii) the unsaturated compound containing an epoxy group; and iii) the silicon-type compound containing an epoxy group, amine group or fluorine group may be included, even when two or more kinds are mixed, in 5 to 100 parts by weight with regard to 100 parts by weight of a) the pre-polymer having a functional group. Within the above ranges, it can prevent swelling and breakage in organic solvents by increasing cross-linking density and enhance the release performance even when fine pattern is to be formed. More preferably, it may be included in 10 to 20 parts by weight.

The photo initiator of c) used for the photocurable resin composition of the present invention may include Irgacure 369, Irgacure 651, Irgacure 907, Irgacure 819 (Ciba Specialty Chemical, Co.), diphenyl-(2,4,6-trimethylbenzoyl)phosphine oxide, methylbenzoylformate, ethyl(2,4,6-trimethylbenzoyl)phenylphosphinate, 2,4-bistrichloromethyl-6-p-methoxystyryl-s-triazine, 2-p-methoxystyryl-4,6-bistrichloromethyl-s-triazine, 2,4-trichloromethyl-6-triazine, 2,4-trichloromethyl-4-methylnaphthyl-6-triazine, benzophenone, p-(diethylamino)benzophenone, 2,2-dichloro-4-phenoxyacetophenone, 2,2-diethoxyacetophenone, 2-dodecylthioxanthone, 2,4-dimethylthioxanthone, 2,4-diethylthioxanthone, 2,2-bis-2-chlorophenyl-4,5,4,5-tetraphenyl-2-1,2-biimidazolo, etc., and they may be used in alone or in combination.

The photo initiator may be included preferably in 0.1 to 10 parts by weight with regard to 100 parts by weight of a) the pre-polymer having a functional group, and when it is within the above ranges, it can satisfy both of the transmittance and storage stability of the cured resin mold that has been fabricated.

The photocurable resin composition comprising the above components may further comprise a surfactant to improve coating performance and enhance release performance when removed out of the mold die.

The surfactant may include polyoxyethyleneoctylphenylether, polyoxyethylenenonylphenylether, F171, F172, F173 (Dainippon Ink) FC430, FC431 (Sumitomo 3M Company), KP341 (ShinEtsu Chemical Co.), etc., and it may be used in 0.01 to 2 parts by weight with regard to 100 parts by weight of a) the pre-polymer having a functional group.

Further, the present invention provides a method of preparing a resin mold using the photocurable resin composition and the resin mold prepared thereby.

The resin mold of the present invention is prepared by comprising the steps of S1) applying the fluorine-containing photocurable resin solution of the present invention to one side of a mold die with pattern formed thereon and curing it to transfer the pattern of the mold die; and S2) releasing the cured polymer resin with the pattern transferred thereto from the mold die.

Preferably, the polymer resin mold may be prepared by further comprising, subsequent to the S2) step, S3a) forming a plasma-treated surface on the back side of the cured polymer resin with the released pattern formed thereon; S4a) forming a back-supporting body on the plasma-treated surface which is formed on the back side of the cured polymer resin; and S5a) adhering or curing a cured polymer resin with the back-supporting body formed thereon.

Also, the method of the present invention may further comprise, subsequent to the above S2) step, S3b) forming a plasma-treated surface on one side of a back-supporting body to be in contact with the cured polymer resin; and S4b) adhering or curing the cured polymer resin onto the plasma-treated surface which is formed on the back-supporting body to prepare a polymer resin mold.

With reference to the accompanying drawings, preferred embodiments of the present invention will be described in detail.

FIG. 1 is a schematic sectional view illustrating a method of preparing a resin mold according to a preferred embodiment of the present invention.

With reference to FIG. 1, a polymer resin solution (102a) is applied to a mold die (101) of which the pattern to be fabricated faces upward. The polymer resin solution (102a) may be applied by spin coating, slit coating, etc.

The polymer resin solution (102a) applied to the mold die (101) is cured by light exposure under nitrogen or atmosphere and the cured polymer resin (102b) with the pattern of the mold die (101) transferred thereto is then released from the mold die (101).

On one side of the released, cured polymer resin (102b), the pattern transferred from the mold die (101) has been formed. The back side of the cured polymer resin (102b) with the pattern formed thereon or one side of a back-supporting body (104) to be in contact with the cured polymer resin (102a) is subject to plasma treatment to form a plasma-treated surface (103) so that the cured polymer resin (102b) with the pattern formed thereon and the back-supporting body (104) can be adhered or bonded to each other.

The back-supporting body (104) is adhered or bonded to the plasma-treated surface (103), which is formed on the back side of the cured polymer resin (102b) or one side of the back-supporting body (104) to be in contact with the cured polymer resin (102a), using an adhesive or a gluing agent. The back-supporting body (104) may have transmittance of at least 85% at light source of 500 wavelengths, and it may include a transparent glass plate (Bare glass), ITO (Indium Tin Oxide) substrate, COC (Cyclic olefin copolymer), Pac (Polyacrylate), PC (Polycarbonate), PE (Polyethylene), PEEK (Polyetheretherketone), PEI (Polyetherimide), PEN (Polyethylenenaphthalate), PES (Polyethersulfone), PET (Polyethyleneterephthalate), PI (Polyimide), PO (Polyolefin), PMMA (Polymethylmethacrylate), PSF (Polysulfone), PVA (Polyvinylalcohol), PVCi (Polyvinylcinnamate), TAC (Triacetylcellulose), polysilicone, polyurethane, epoxy resin, etc. Preferably, it may have transmittance of 97 to 99.9% at the light source of 500 nm wavelengths.

The back-supporting body (104) adhered or bonded to the cured polymer resin (102b) may be subject to additional adhering or curing process in which UV light or heat is applied to fully adhere it to the mold resin, thereby to produce a final polymer resin mold (105).

For better understanding of the present invention, preferred embodiments follow. The following examples are intended to merely illustrate the invention without limiting the scope of the invention.

EXAMPLES

Example 1

(A-1) Preparation of Silicon-Modified Urethane Compound Having Functional Group

To a flask equipped with a cooling tube and a stirrer were slowly added 500 parts by weight of 2-hydroxyethyl methacrylate; and 100 parts by weight of toluene diisocyanate, which were then slowly heated to 80° C. and stirred to react for 2 hours or so. Then, 50 parts by weight of polydimethylsiloxane and 1 part by weight of triethylamine as a catalyst were added and reacted for additional 3 hours. The disappearance of isocyanate was confirmed by an infrared spectrophotometer thereby to obtain a colorless, transparent silicon-modified urethane compound having a functional group (a-1).

(A-2) Preparation of Reactive Pre-Polymer Having Functional Group

To a flask with a cooling tube and a stirrer were added 30 parts by weight of the silicon-modified urethane compound having a functional group (a-1) obtained in (A-1); 70 parts by weight of 3-perfluorohexylhydroxylpropylmethacrylate; and 3.5 parts by weight of 2,2'-azobis(2,4-dimethylvaleronitrile), which were then slowly stirred after nitrogen substitution.

The reaction solution was heated to 70° C. and then reacted for 5 hours to prepare a reactive pre-polymer having a functional group.

(A-3) Preparation of Fluorine-Containing Photocurable Resin Composition

100 Parts by weight of the reactive pre-polymer having a functional group obtained in (A-2); 20 parts by weight of a mixture obtained by mixing 10 parts by weight of glycidyl methacrylate, 10 parts by weight of (3-glycidoxypropyl)trimethoxysilane; and 0.01 parts by weight of KP341 (ShinEtsu Chemical Co.) as a surfactant were added and evenly stirred at 300 to 400 rpm at a room temperature for 20 hours thereby to prepare a transparent resin solution (102a) in a liquid phase.

Next, the thus prepared resin solution was applied to a mold die (101) of which the pattern was facing upward by slit coating so that its thickness became 100 μm. The polymer resin applied to the mold die (101) was cured by UV exposure under nitrogen atmosphere, and a cured polymer resin (102b) with the pattern of the mold die (101) transferred thereto was released from the mold die (101).

The back side of the face on which the pattern of the released, cured polymer resin (102b) was formed was subject to plasma treatment to form a plasma-treated surface (103) so that the cured polymer resin (102b) with the pattern formed thereon and a back-supporting body (104) can be adhered or bonded to each other. Then, the back side (plasma-treated surface (103)) of the face on which the pattern of the released, cured polymer resin (102b) is formed and a glass plate which was the back-supporting body (104) were contacted to adhere the resin and the supporting body.

In order to completely bond the adhered, cured polymer resin (102b) and the back-supporting body (104), it was placed in a convection oven of 100° C. and heated for 1 hour to complete a final polymer resin mold (105).

Example 2

50 Parts by weight of the silicon-modified urethane compound having a functional group (a-1) obtained in (A-1) of Example 1; 50 parts by weight of 3-perfluorohexylhydroxylpropylmethacrylate; and 3.5 parts by weight of 2,2'-azobis (2,4-dimethylvaleronitrile) were added and then slowly stirred after nitrogen substitution.

With the exception that the reaction solution was heated to 70° C. and then reacted for 5 hours to prepare a reactive pre-polymer having a functional group, the same method as Example 1 above was carried out.

Example 3

65 Parts by weight of (a-1) the silicon-modified urethane compound having a functional group obtained in (A-1) of Example 1; 35 parts by weight of 3-perfluorohexylhydroxylpropylmethacrylate; and 3.5 parts by weight of 2,2'-azobis (2,4-dimethylvaleronitrile) were added and then slowly stirred after nitrogen substitution.

With the exception that the reaction solution was heated to 70° C. and then reacted for 5 hours to prepare a reactive pre-polymer having a functional group, the same method as Example 1 was carried out.

Example 4

80 Parts by weight of (a-1) the silicon-modified urethane compound having a functional group obtained in (A-1) of Example 1; 20 parts by weight of 3-perfluorohexylhydroxylpropylmethacrylate; and 3.5 parts by weight of 2,2'-azobis (2,4-dimethylvaleronitrile) were added and then slowly stirred after nitrogen substitution.

With the exception that the reaction solution was heated to 70° C. and then reacted for 5 hours to prepare a reactive pre-polymer having a functional group, the same method as Example 1 was carried out.

Comparative Example 1

With the exception that 20 parts by weight of a mixture obtained by mixing 10 parts by weight of glycidyl methacrylate and 10 parts by weight of (3-glycidoxypropyl)trimethoxysilane, 1 part by weight of ethyl(2,4,6-trimethylbenzoyl) phenylphosphinate as a photo initiator, and 0.01 parts by weight of KP341 (ShinEtsu Chemical Co.) as a surfactant were added and evenly stirred at 300 to 400 rpm for 20 hours to prepare a transparent resin solution (102a) in a liquid phase, the same method as Example 1 was carried out.

Comparative Example 2

100 Parts by weight of an oligomer having 25 parts by weight of phenyl epoxy acrylate; 20 parts by weight of a mixture obtained by mixing 10 parts by weight of glycidyl methacrylate and 10 parts by weight of (3-glycidoxypropyl) trimethoxysilane; 1 part by weight of ethyl(2,4,6-trimethylbenzoyl)phenylphosphinate as a photo initiator; and 0.01 parts by weight of KP341 (ShinEtsu Chemical Co.) as a surfactant were added and evenly stirred at 300 to 400 rpm for 20 hours to prepare a resin solution, and a final mold was fabricated using the same method as Example 1 above.

Comparative Example 3

Instead of the polymer resin solution prepared in Example 1, the existing polymer resin mold material, PDMS (Dow-Corning Company, Sylgard® 184 silicone elastomer kit), was applied to a mold die (101) in a thickness of 100 μm as in Example 1 and cured by sintering at an oven of 60° C. for 180 min and then, the cured resin was released from the mold die.

Wettability, release performance, chemical resistance, and transmittance were measured using the polymer resin molds fabricated in Examples 1 to 4 and Comparative Examples 1 to 3 in accordance with the following methods, and the results are summarized in Table 1 below.

1) Wettability—Water drops were dropped onto the polymer resin molds prepared in Examples 1 to 4 and Comparative Examples 1 to 3 and contact angles between the resin mold surfaces and the water drops were each measured five times to calculate the average of the contact angles.

2) Release Performance—The front sides of the polymer resin molds prepared in Examples 1 to 4 and Comparative Examples 1 to 3 were coated by a conventional acryl-type resin combined with a suitable amount of a photo-curing agent, covered by glass and then fully cured under an UV lamp.

Then, the interfaces between the polymer resin molds prepared in Examples 1 to 4 and Comparative Examples 1 to 3 and the cured acryl-type resins were pulled by hand to release them.

The results were divided into the case where the release was possible by hand (marked as ⊚), the case where the release was possible only when space between the interfaces was secured using a tool such as a cutter knife (marked as ○), and the case where no release was possible, that is, a part or all of the polymer resin molds prepared in Examples 1 to 4 and Comparative Examples 1 to 3 or the cured acryl-type resin was chipped off by damage (marked as X in the table).

3) Chemical resistance—The polymer resin molds prepared in Examples 1 to 4 and Comparative Examples 1 to 3 were completely immersed in acetone and let stand for 7 days and then, changes in the weights of the resin molds were measured. If weight change rate with regard to the beginning was 0 to 3%, it was marked excellent; if it was 3 to 5%, it was marked good; and if it was more than 5%, it was marked poor.

4) Transmittance—The visible light absorption spectrum of the polymer resin molds prepared in Examples 1 to 4 and Comparative Examples 1 to 3 was measured and their light transmittance at 400 nm was recorded.

TABLE 1

|  | Wettability | Release Performance | Chemical resistance | Transmittance |
| --- | --- | --- | --- | --- |
| Ex. 1 | 95.8 | ⊚ | Excellent | 95.3 |
| Ex. 2 | 100.2 | ⊚ | Excellent | 95.8 |
| Ex. 3 | 98.5 | ⊚ | Excellent | 95.9 |
| Ex. 4 | 96.7 | ⊚ | Excellent | 96.5 |
| Com. Ex. 1 | 81.2 | ○ | Good | 95.0 |
| Com. Ex. 2 | 72.5 | X | Poor | 96.8 |
| Com. Ex. 3 | 101.6 | ⊚ | Poor | 97.5 |

As shown in Table 1 above, the polymer resin molds prepared in Examples 1 to 4 prepared using the fluorine-containing photocurable polymer resin compositions of the present invention exhibited equal or above transmittance when compared to those of Comparative Examples 1 to 3 and further, they exhibited not only superior chemical resistance but also excellent wettability and release performance.

The present invention, which relates to a fluorine-containing photocurable resin composition and a method of preparing a mold comprising the same, provides a photocurable resin composition having chemical resistance, mechanical properties and high transmittance, etc. as well as being easily wetted with and released from thermosetting or photocurable resins for pattern formation regardless of additional surface treatment, as opposed to silicon-type polymer resins, fluorine-type polymer resins, thermosetting or photocurable polymer resin materials used for the prior resin molds, and it enables to form a fine pattern necessary to various electronic device industry processes including semiconductors and displays in an easy and stable way.

What is claimed is:

1. A method of preparing a polymer resin mold, comprising:
    S1) applying a fluorine-containing photocurable resin solution to one side of a mold die with a pattern formed thereon and curing it to transfer the pattern of the mold die; and
    S2) releasing the cured polymer resin with the pattern transferred thereto from the mold die;
    S3a) forming a plasma-treated surface on the back side of the cured polymer resin with the released pattern formed thereon;
    S4a) forming a back-supporting body on the plasma-treated surface which is formed on the back side of the cured polymer resin; and
    S5a) adhering or curing the cured polymer resin with the back-supporting body formed thereon to prepare a polymer resin mold,
    wherein the photocurable resin composition comprises:
    a) 100 parts by weight of a reactive pre-polymer prepared by polymerizing
        i) a reactive fluorine-containing compound having a functional group; and
        ii) a reactive silicon-modified urethane compound having a functional group;
    b) 5 to 100 parts by weight of at least one compound selected from the group consisting of i) an olefin-type unsaturated compound;
        ii) an unsaturated compound containing an epoxy group; and
        iii) a silicon-type compound containing an epoxy group, amine group or fluorine group; and
    c) 0.1 to 10 parts by weight of a photo initiator,
    wherein a) i) the reactive fluorine-containing compound having a functional group is at least one selected from the group consisting of 6-perfluorohexanol, 3-perfluorobutylpropanol, 2-perfluoropropyltetrafluoropropanol, 2,5-ditrifluoromethyldioxaundecafluorononanol, octafluorohexanediol, perfluorobutylepoxypropane, perfluoromethylbutylepoxypropane, tetrafluoropropoxyepoxypropane, 1,4-bisepoxypropylperfluoro-n-butane, perfluorohexylethylene, 1-methoxyperfluoromethylpropane, 1,4-divinyldodecafluorohexane, 3-perfluorobutylhydroxypropylmethacrylate, 3-perfluorohexylhydroxylpropylmethacrylate, trifluoroethylmethacrylate, tetrafluoropropylmethacrylate, 2-perfluorohexylethylacrylate, 3-perfluoromethylbutyl-2-hydroxypropylacrylate, methyltrifluoroacetate, ethyltrifluoroacetate, trifluoroethylmethylether, tetrafluoroethylmethylether, hectafluorobutylamine, tridecafluoroheptylamine, and derivatives thereof,
    wherein a) ii) the reactive silicon-modified urethane compound having a functional group is prepared by reacting an isocyanate compound; an olefin-type unsaturated compound having at least one hydroxy group and functional group being at least one selected from the group consisting of 2-hydroxymethylmethacrylate, 2-hydroxyethylmethacrylate, 2-hydroxypropylmethacrylate, 4-hydroxyethylacrylate, and 4-hydroxybutylacrylate; and polydimethylsiloxane.

2. A method of preparing a polymer resin mold, comprising:
    S1) applying a fluorine-containing photocurable resin solution to one side of a mold die with a pattern formed thereon and curing it to transfer the pattern of the mold die; and
    S2) releasing the cured polymer resin with the pattern transferred thereto from the mold die;
    S3b) forming a plasma-treated surface on one side of a back-supporting body to be in contact with the cured polymer resin; and
    S4b) adhering or curing the cured polymer resin onto the plasma-treated surface which is formed on the back-supporting body to prepare a polymer resin mold,
    wherein the photocurable resin composition comprises:
    a) 100 parts by weight of a reactive pre-polymer prepared by polymerizing
        i) a reactive fluorine-containing compound having a functional group; and
        ii) a reactive silicon-modified urethane compound having a functional group;
    b) 5 to 100 parts by weight of at least one compound selected from the group consisting of i) an olefin-type unsaturated compound;
        ii) an unsaturated compound containing an epoxy group; and
        iii) a silicon-type compound containing an epoxy group, amine group or fluorine group; and
    c) 0.1 to 10 parts by weight of a photo initiator,
    wherein a) i) the reactive fluorine-containing compound having a functional group is at least one selected from the group consisting of 6-perfluorohexanol, 3-perfluorobutylpropanol, 2-perfluoropropyltetrafluoropropanol, 2,5-ditrifluoromethyldioxaundecafluorononanol, octafluorohexanediol, perfluorobutylepoxypropane, perfluoromethylbutylepoxypropane, tetrafluoropropoxyepoxypropane, 1,4-bisepoxypropylperfluoro-n-butane, perfluorohexylethylene, 1-methoxyperfluoromethylpropane, 1,4-divinyldodecafluorohexane, 3-perfluorobutylhydroxypropylmethacrylate, 3-perfluorohexylhydroxylpropylmethacrylate, trifluoroethylmethacrylate, tetrafluoropropylmethacrylate, 2-perfluorohexylethylacrylate, 3-perfluoromethylbutyl-2-hydroxypropylacrylate, methyltrifluoroacetate, ethyltrifluoroacetate, trifluoroethylmethylether, tetrafluoroethylmethylether, hectafluorobutylamine, tridecafluoroheptylamine, and derivatives thereof,
    wherein a) ii) the reactive silicon-modified urethane compound having a functional group is prepared by reacting an isocyanate compound; an olefin-type unsaturated compound having at least one hydroxy group and functional group being at least one selected from the group consisting of 2-hydroxymethylmethacrylate, 2-hydroxyethylmethacrylate, 2-hydroxypropylmethacrylate, 4-hydroxyethylacrylate, and 4-hydroxybutylacrylate; and polydimethylsiloxane.

3. A polymer resin mold prepared by the method of preparing the polymer resin mold set forth in claim 1.

4. A polymer resin mold prepared by the method of preparing the polymer resin mold set forth in claim 2.

* * * * *